(No Model.)
J. C. LIGHTHOUSE.
PNEUMATIC TIRE.
No. 559,297.  Patented Apr. 28, 1896.
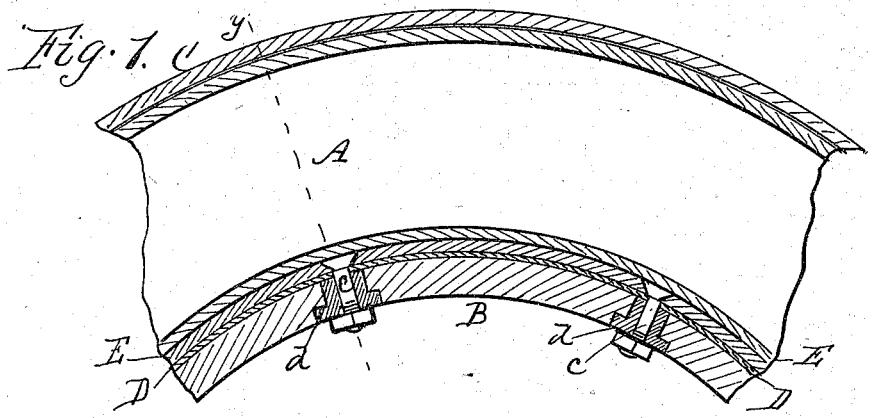
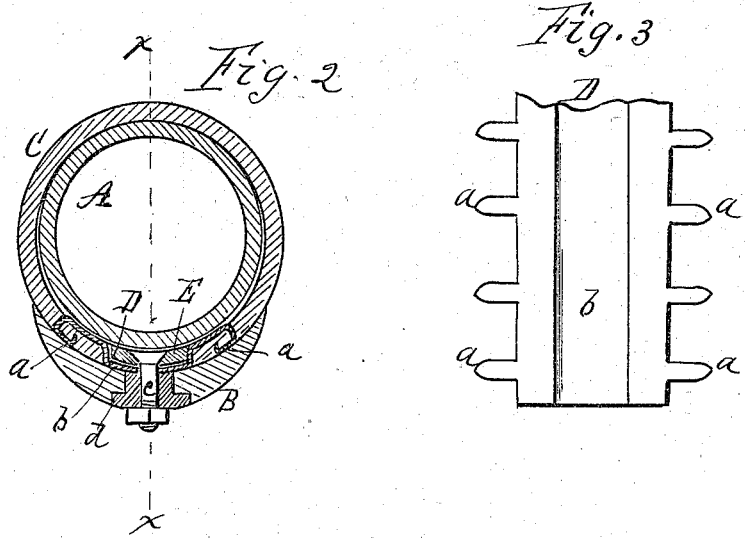
Witnesses:
C. R. Osgood
F. B. Hutchinson
Inventor.
John C. Lighthouse,
per R. F. Osgood,
Attorney.

UNITED STATES PATENT OFFICE.

JOHN C. LIGHTHOUSE, OF ROCHESTER, NEW YORK.

PNEUMATIC TIRE.

SPECIFICATION forming part of Letters Patent No. 559,297, dated April 28, 1896.

Application filed July 26, 1895. Serial No. 557,254. (No model.)

*To all whom it may concern:*

Be it known that I, JOHN C. LIGHTHOUSE, of Rochester, in the county of Monroe and State of New York, have invented a certain new and useful Improvement in Pneumatic Tires; and I do hereby declare that the following is a full, clear, and exact description of the same, reference being had to the drawings accompanying this application.

The object of my improvement is to protect the rubber tube from being punctured by the employment of an exterior covering of leather or equivalent material, which is attached to the wheel-rim in a peculiar manner, as will be more fully described.

The invention consists in the construction and arrangement of parts hereinafter set forth, and embodied in the claims.

In the drawings, Figure 1 is a longitudinal section of the tire in line $x\ x$ of Fig. 2. Fig. 2 is a cross-section in line $y\ y$ of Fig. 1. Fig. 3 is a plan view of a portion of the metal band for connecting the edges of the external leather covering.

A indicates the ordinary inflatable rubber tube, and B the wheel-rim, which is ordinarily made of wood. C is an external covering which incloses the air-tube, said covering being also made in tubular form and preferably of leather, although other material, such as strong canvas, can be employed. This covering is made of a strip folded over, the edges being brought to the inner side and properly secured beneath or within the wheel-rim B.

D is a thin metallic band extending around the tire and serving to connect the edges of the leather. For this purpose it is provided at its edges with sharp-pointed spurs $a\ a$ and in the center with a longitudinal groove or cavity $b$, the spurs being turned down and clenched through the edges of the leather, as shown, and the center groove serving to receive the binding-strip E, which also extends around the wheel. By this means the edges of the leather are secured, forming a tube which incloses the air-tube, and the binding-strip is seated without making any undue projection of the parts and preserving the symmetry of the tire. The wheel-rim B is secured to the tire by means of bolts or screws $c\ c$, which pass through it and also through the band D and into the binding-strip E, which thus serves as the connection between the parts and gives stiffness and support to the tire. The bolts or screws pass through bearings $d\ d$, set into the wheel-rim to prevent wear and give suitable support. The bolt-heads may be either on the outer or inner side.

The binding-strip E is essential to connect the tire to the wheel-rim and to give stability to the attachment. If desired, the leather covering may be thickened at the tread-surface to resist puncture and wear.

It is found that leather is a desirable material with which to cover the air-tube, as it is tough, strong, and resists puncture to a great degree and prevents slipping, and the means above described for connecting the edges and for uniting the parts renders it convenient in use. By the use of the sharp points of the band the leather can be connected and disconnected with great facility.

Having described my invention, what I claim as new, and desire to secure by Letters Patent, is—

1. In a pneumatic tire, the combination with the covering C having its edges separated, the binding-strip D provided on opposite sides with spurs $a$ taking into the edges of the covering from its inner face and also provided with a longitudinal groove $b$ in its outer face and of the same depth as the thickness of a covering, and a band E resting in and filling said groove, the binding-strip and band forming a connection which is of the same thickness as that of the covering at its edges and is continuous therewith; of the wheel-rim, and bolts $c$ connecting the band therewith, as and for the purpose set forth.

2. In a pneumatic tire, the combination with the covering C having its edges separated, the binding-strip D provided on opposite sides with spurs $a$ taking into the edges of the covering from its inner face and also provided with a longitudinal groove $b$ in its outer face and of the same depth as the thickness of a covering, and a band E resting in and filling said groove, the binding-strip and band forming a connection which is of the same thickness as that of the covering at its edges and is continuous therewith; of the wheel-rim B, bearings $d$ set into the same from its inner face outward, and bolts $c$ passing through the band, the strip, and the bearings individually, and having nuts on their inner ends, as and for the purpose set forth.

In witness whereof I have hereunto signed my name in the presence of two subscribing witnesses.

J. C. LIGHTHOUSE.

Witnesses:
R. F. OSGOOD,
A. W. WILBUR.